United States Patent Office 2,760,775
Patented Aug. 28, 1956

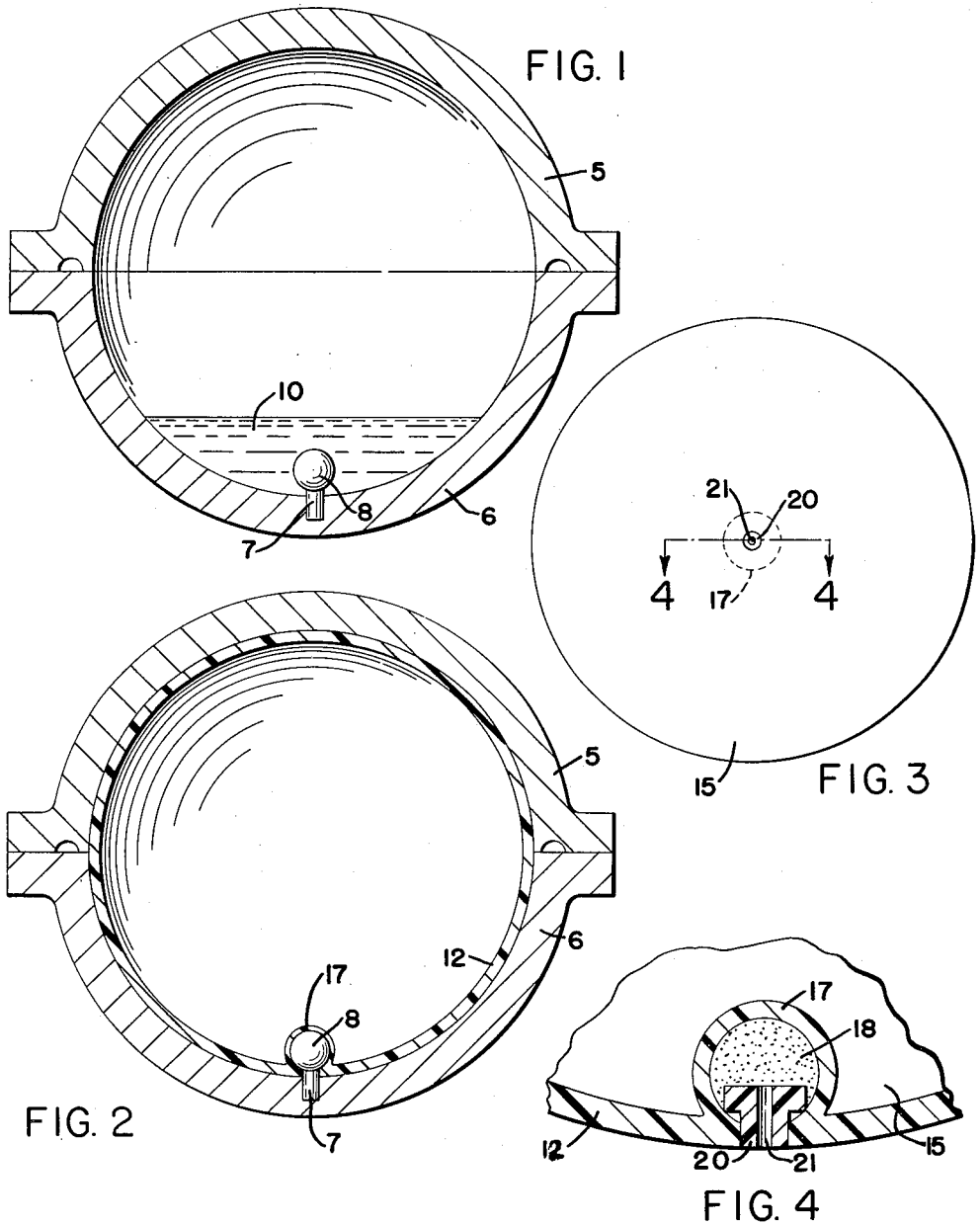

2,760,775

SEAMLESS PLASTIC BALL WITH INTEGRALLY FORMED VALVE HOUSING

James R. Tipton, Ashland, Ohio, assignor to Eagle Rubber Co., Inc., Ashland, Ohio, a corporation of Ohio Application March 31, 1954, Serial No. 420,124

1 Claim. (Cl. 273—58)

The invention relates to an inflated, seamless plastic ball. The valve housing is formed integrally with the ball on its interior, all in one operation. It contains suitable valve means.

In a preferred embodiment of the invention, the housing is filled with a soft puncture-sealing material. The housing opens into the surface of the ball and is closed with a plug. There is preferably a channel through the plug to the puncture-sealing material. The ball is inflated by inserting an inflating needle through the opening in the plug and thence through the puncture-sealing material, and then puncturing the wall of the housing with it. The ball is then inflated in the usual manner. On completion of the inflating operation, the needle is removed and the puncture-sealing material seals the hole in the wall of the pocket as well as the inner end of the channel in the plug.

The valve housing is formed by putting a pin with a head on it, in the wall of the mold cavity in which the ball is formed. If the ball is to be made of rubber, a biscuit of rubber with the inflating pill within it will be inserted in the mold cavity and inflated in the usual way, and the rubber will cover the pin and automatically form the housing as an integral part of the ball. Alternatively the ball may be made from a plastisol. A plastisol is a dispersion of vinyl resin or other plastic in a plasticizer in which it dissolves on heating. The required amount of plastisol is put into the mold cavity and the mold is tilted or revolved and simultaneously heated so that the entire surface of the cavity and the surface of the pin are covered with a skin of the plastic of desired thickness. Thereafter the mold is opened and the ball is removed from it. The housing formed by the pin is then filled with a soft puncture-sealing composition and a plug is inserted to close the opening in the housing.

There are many soft puncture-sealing compositions known in the industry. Any one of these may be employed. In general, they are rubber cements compounded to harden on exposure to air.

The invention will be further described in connection with the accompanying drawing, in which—

Fig. 1 is a section through the mold with plastisol in it;

Fig. 2 is a section through the same with the interior of the mold coated with the plastic;

Fig. 3 is a view of the top of the completed ball; and

Fig. 4 is an enlarged detail of the ball showing the pocket filled with the puncture-sealing composition and stoppered by the plug.

The mold is of the usual type and is composed of the two halves 5 and 6. The pin which includes the stem 7 and ball 8, is permanently fastened in the wall of the mold cavity. If the plastic is applied as a liquid there is some advantage in having the pin in the bottom of the mold cavity to insure that it is completely covered with the liquid.

For the purpose of illustration it is supposed that the necessary amount of plastisol 10 is put in the mold. By imparting the proper motion to the mold the plastisol is made to cover the entire surface of the cavity and the pin so that the resulting ball is seamless, and by heating the mold the plastic dispersed in the liquid phase of the plastisol is caused to dissolve into the liquid and form the plastic coating 12 (Fig. 2).

The mold is then opened and the finished ball 15 is removed. The surface of the ball is formed of the deposit 12. The pin forms the housing 17 which is formed integrally with the ball, being in one piece with the rest of the ball and formed simultaneously therewith. This is filled with soft puncture-sealing composition 18 and the opening is stoppered by the plug 20. Plugs of various shapes and compositions may be used. The vertical wall of the plug is coacted with an adhesive or a solvent for the plastic, so that the plug is sealed to the opening in the wall of the ball.

To inflate the ball, the inflating needle is passed through the channel 21 in the plug, then through the puncture-sealing composition 18, and then is pressed through the wall of the pocket 17, opposite the channel. The ball is then inflated. On removal of the needle the puncture-sealing composition seals the opening in the wall 17 and also the inner end of the channel 21.

The invention is defined in the following claim.

What I claim is:

An inflated, seamless plastic ball with a small housing integrally molded therein, the wall of the ball having a small opening therethrough which opens into the housing, and sealing means in the housing.

References Cited in the file of this patent

UNITED STATES PATENTS

| | | |
|---|---|---|
| 646,785 | Alden | Apr. 3, 1900 |
| 1,603,513 | Carter | Oct. 19, 1926 |
| 2,136,432 | Gattuso | Nov. 15, 1938 |
| 2,142,414 | Riddell | Jan. 3, 1939 |
| 2,161,281 | Carter | June 6, 1939 |
| 2,387,433 | Fenton | Oct. 23, 1945 |
| 2,387,455 | McDermott | Oct. 23, 1945 |
| 2,448,640 | Weston | Sept. 7, 1948 |
| 2,562,204 | Milton | July 31, 1951 |
| 2,625,398 | Robinson et al. | Jan. 13, 1953 |